United States Patent

[11] 3,587,314

| [72] | Inventor | Donald J. Kullmann<br>Fox Point, Wis. |
|---|---|---|
| [21] | Appl. No. | 664,442 |
| [22] | Filed | Aug. 30, 1967 |
| [45] | Patented | June 28, 1971 |
| [73] | Assignee | Badger Meter Manufacturing Company,<br>Milwaukee, Wis. |

[54] METERING APPARATUS
22 Claims, 13 Drawing Figs.

[52] U.S. Cl. .................................................. 73/252, 73/257
[51] Int. Cl. ...................................................... G01p 5/00
[50] Field of Search ........................................... 73/252, 253, 257; 310/104

[56] References Cited

UNITED STATES PATENTS

| 1,834,025 | 12/1931 | Grangor | 73/257 |
| 1,961,688 | 6/1934 | Hazard | 73/257 |
| 1,999,684 | 4/1935 | Bradley | 73/257 |
| 2,016,347 | 10/1935 | Smith | 73/257 |

FOREIGN PATENTS

| 530,936 | 8/1931 | Germany | 73/257 |
| 242,311 | 1926 | Great Britain. | |
| 495,414 | 1950 | Belgium. | |
| 813,602 | 1951 | Germany. | |

Primary Examiner—Richard C. Queisser
Assistant Examiner—John K. Lunsford
Attorney—Pendleton, Neuman, Williams & Anderson ABSTRACT: An oscillating piston-type fluid meter including a measuring chamber formed of a thin walled stamped and drawn metal housing, with a piston of a height equal to the internal height of the chamber wall, center hub, output drive and division plate means mounted on the housing, and a flat plate cover over the end of the housing and the piston. The measuring chamber unit is supported in a cup-shaped meter casing with a resilient gasket compressed between the sidewall of the chamber around the outlet port and the casing wall around an aligned outlet passage, and support lugs engage the opposite side of the housing adjacent the end wall. A resilient ring applies a compressive force to the cover in alignment with the sidewall of the chamber to retain the cover and the chamber unit in position. An annular strainer is mounted on the support lugs and extends radially between the housing wall and the casing wall.

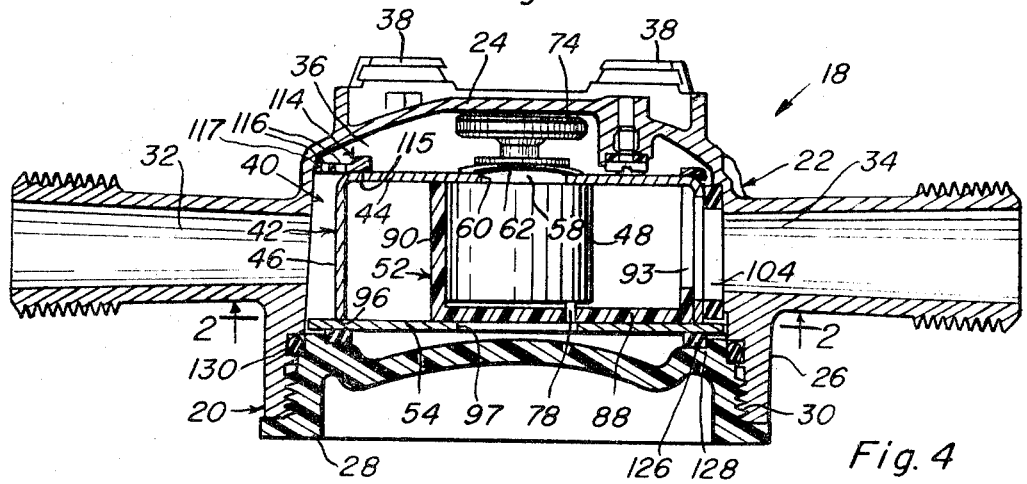
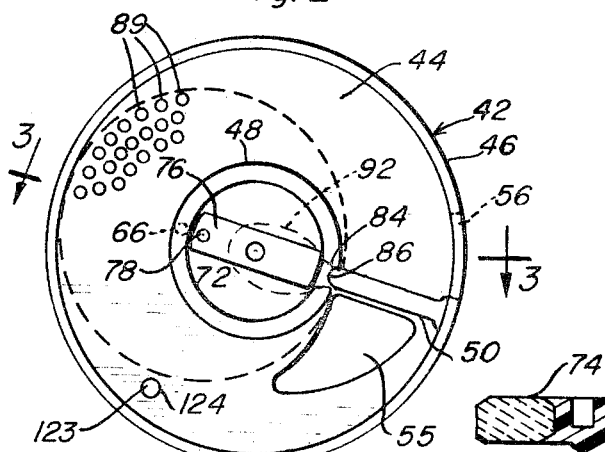
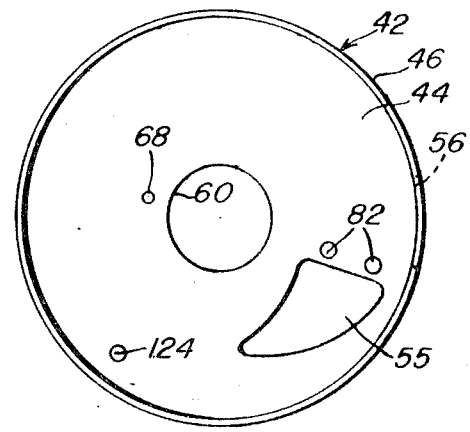
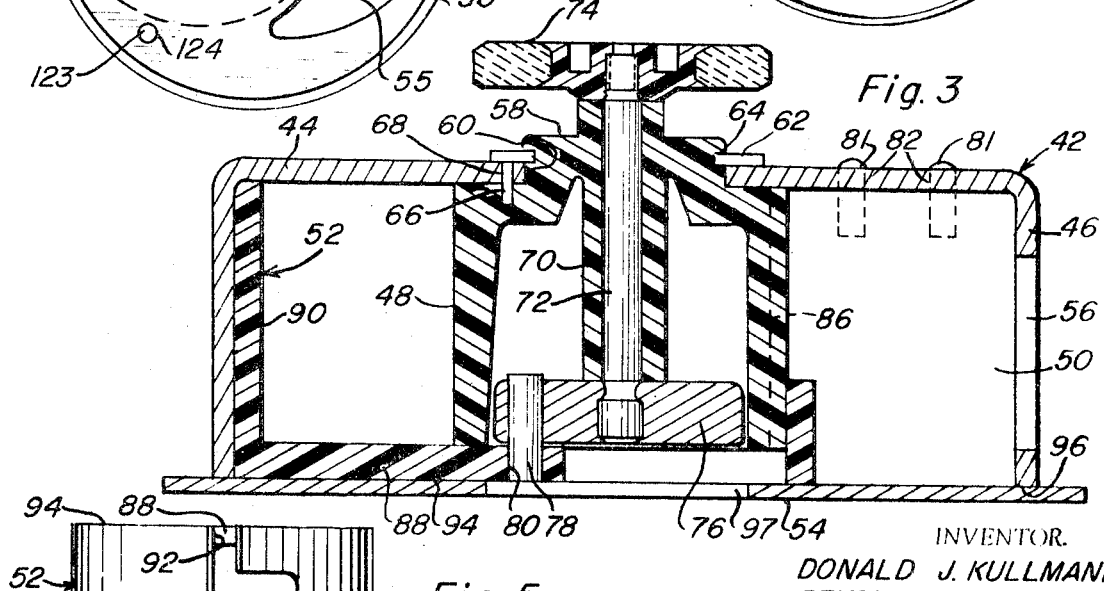
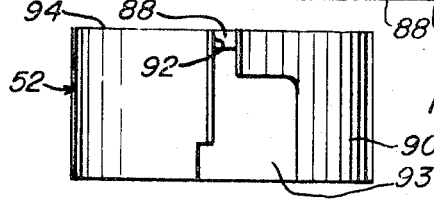
INVENTOR.
DONALD J. KULLMANN
BY PENDLETON, NEUMAN
SEIBOLD & WILLIAMS
ATTORNEYS

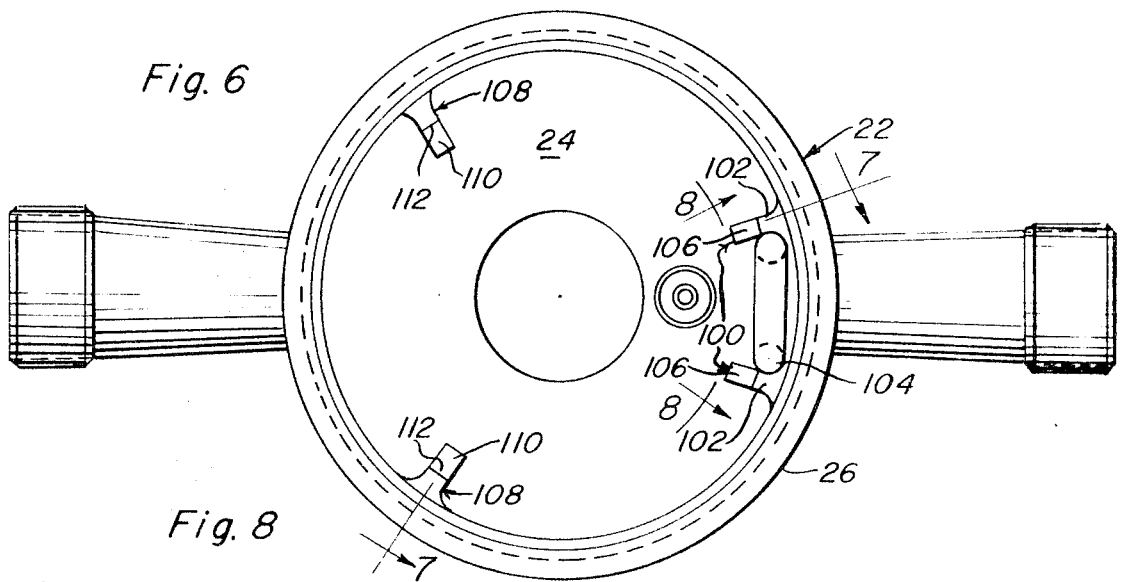
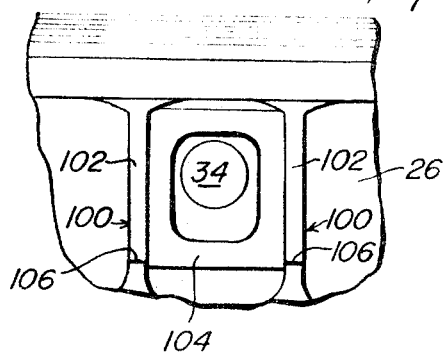
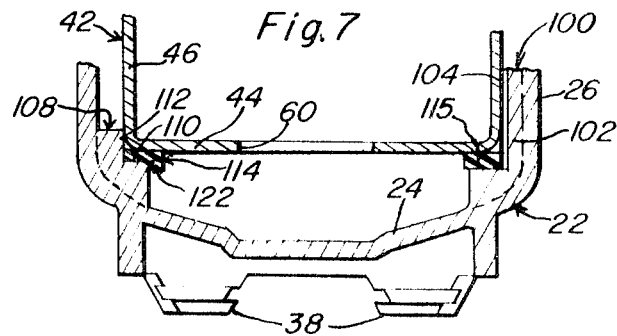
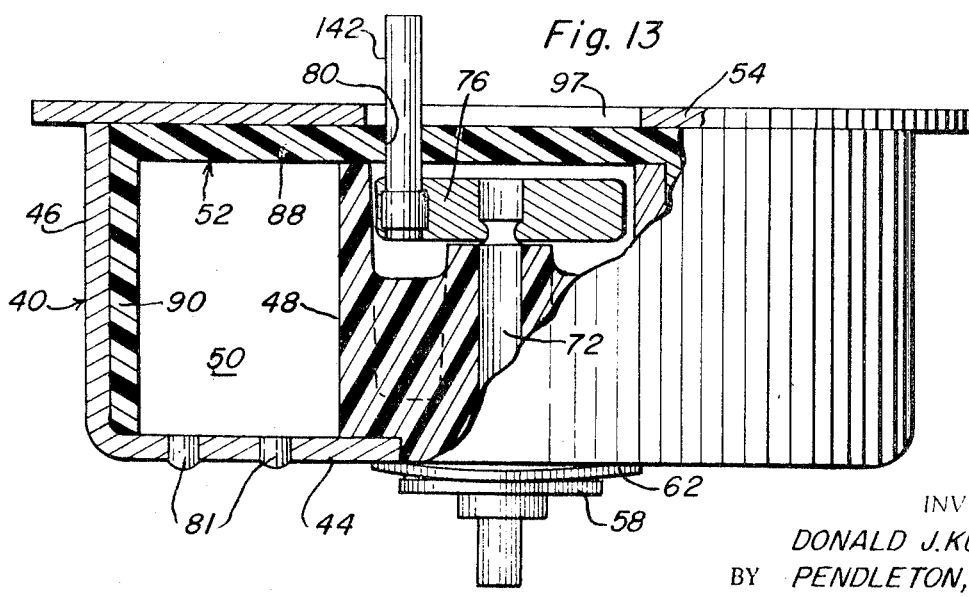
INVENTOR.
DONALD J. KULLMANN
BY PENDLETON, NEUMAN
SEIBOLD & WILLIAMS
ATTORNEYS

INVENTOR.
DONALD J. KULLMANN
BY PENDLETON, NEUMAN
SEIBOLD & WILLIAMS

ATTORNEYS

METERING APPARATUS

BACKGROUND OF THE INVENTION

1. Field of the Invention

This invention relates to meters and particularly to fluid meters of the oscillating piston or rotary piston type, referred to hereinafter as oscillating piston meters.

2. Description of the Prior Art

The prior art includes a variety of oscillating piston meters. However, the necessity of obtaining and maintaining close dimensional tolerances in the measuring chamber of these meters, as well as the size and complexity of the components and the complexity of the overall assemblies have contributed to sustaining the cost of manufacture and assembly of such meters. For instance, the manner in which the various components of the measuring chambers have been fabricated and interrelated has required that a substantial number of dimensions be maintained within close tolerances for accurate metering operation. (This is illustrated, in part, by the discussion in the Lindley U.S. Pat. No. 2,566,220, particularly at Column 3, lines 42—67.) Also, due to the requirement for close tolerances, the measuring chamber housings typically have been produced of relatively heavy, thick-walled castings or moldings to provide adequate strength against deformation of the chambers during their installation and use as well as during manufacture, thereby increasing the cost of the components and the size of the metering apparatus. The strength requirement has been enhanced in some meters by the mounting of the chambers in a manner providing substantial lateral or radial forces on the sidewalls of the chamber.

It is an object of this invention to provide improved oscillating piston fluid flow meters which maintain a high degree of metering accuracy and which may be economically produced. To this end, more detailed objects include reducing the number of dimensions which must be maintained within close tolerances in an oscillating piston measuring device, providing measuring chamber housings which may be economically produced, reducing the size and cost of the meter components, and providing simplified oscillating piston meter assemblies. Further and additional objects and advantages will appear from the description, accompanying drawings and appended claims.

SUMMARY OF THE INVENTION

In carrying out this invention in one illustrative form, an oscillating piston measuring device is provided comprising a housing defining a cylindrical chamber, inner hub and division plate means disposed in said chamber and mounted on said housing, a piston which is oscillatable about the inner guide and division plate means and which has its outer end surface coplanar with the outer end of the sidewall of the chamber housing, and a cover having a flat undersurface overlying said piston and the outer end of said sidewall. The housing comprises a stamped and drawn cup-shaped metal element having relatively thin walls, and is positioned in a cup-shaped meter casing with a resilient gasket element between the outlet port of the chamber and the outlet passage of the casing, without substantial lateral deforming pressure on the sidewalls of the chamber. The cover is positioned on the housing without close lateral restraint, and the cover and housing are maintained in position in the casing by resilient means engaging the cover over the sidewall.

For a more complete understanding of this invention, reference should now be had to the embodiments illustrated in the accompanying drawings and described below, by way of example of the invention.

BRIEF DESCRIPTION OF THE DRAWINGS

FIG. 1 is a cross-sectional view of an oscillating piston meter apparatus embodying teachings of this invention;

FIG. 2 is an enlarged plan view of the measuring device of the apparatus in FIG. 1, taken generally along line 2-2 of FIG. 1 and looking in the direction of the arrows, with the piston shown in dashed lines;

FIG. 3 is an enlarged cross-sectional view taken along radial lines 3-3 of FIG. 2 and looking in the direction of the arrows, with the cover on the measuring chamber;

FIG. 4 is a plan view of the measuring chamber housing of the apparatus as in FIG. 2;

FIG. 5 is an enlarged elevation view of the piston of the apparatus in FIG. 1;

FIG. 6 is an enlarged plan view of the meter casing unit shown in FIG. 1, with the outlet gasket in place;

FIG. 7 is a reduced cross-sectional view taken along radial lines 7-7 of FIG. 6 and looking in the direction of the arrows, with a strainer and measuring chamber housing supported in the casing;

FIG. 8 is a partial view taken along curved line 8-8 of FIG. 6 and looking outward as indicated by the arrows;

DESCRIPTION

Figure 9:
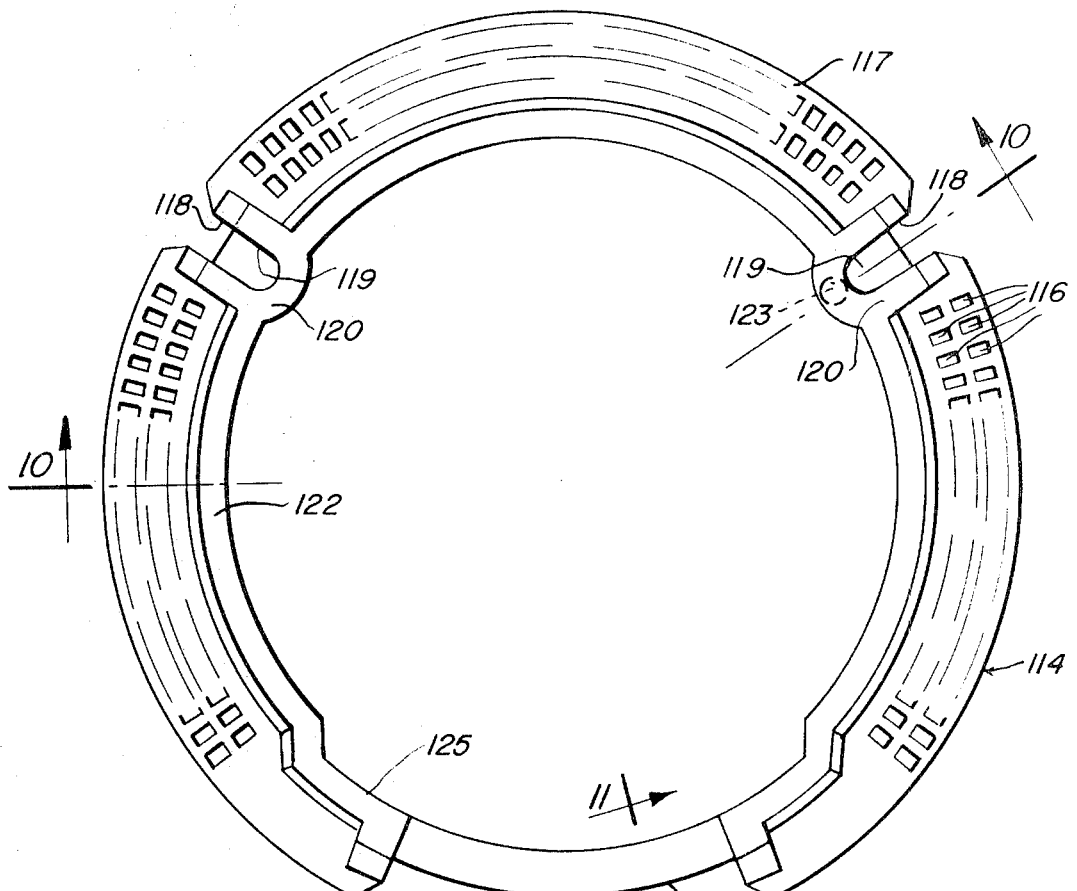
FIG. 9 is an enlarged plan view of the strainer of the apparatus of FIG. 1.

Referring first to FIG. 1, the illustrated metering apparatus 18 comprises a casing 20 including a generally cup-shaped casing unit 22, having an end wall 24 and an annular sidewall 26, and an end closure cap 28 having threaded engagement with the wall 26 at 30. The casing unit 22 may be a suitable casting or plastic molding. An inlet passage 32 and an outlet passage 34 communicate with the interior cavity 36 of the casing through the sidewall 26. The casing element 22 is provided with attachment lug or shoulder elements 38 for mounting an appropriate register assembly, which may include a shroud, for instance, as illustrated in Kullmann U.S. Pat. No. 3,308,664, issued Mar. 14, 1967.

An oscillating piston measuring chamber device 40 is mounted in cavity 36. Device 40 comprises a cup-shaped housing 42, including an end wall 44 and a right circular cylindrical sidewall 46, an inner cylinder or hub 48, a division plate 50 (see FIG. 2), an oscillatable piston 52 and a cover 54.

Referring now also to FIGS. 2, 3 and 4, the housing 42 is formed with an inlet port 55 in end wall 44 and an outlet port 56 through sidewall 46. Hub 48 has a right circular cylindrical external surface and is formed with a boss 58 which extends through a central opening 60 in end wall 44. A spring clip 62 engages an annular recess 64 in boss 58 to retain the hub 48, and a pin 66 mounted in the guide wall engages opening 68 in wall 44 for angular indexing of the hub 48 and division plate 50. A further boss 70 journals a shaft 72 having an output element comprising an annular ceramic magnet 74 mounted on its outer end. Magnet 74 is positioned closely adjacent the underside of wall 24 (see FIG. 1) for magnetic drive engagement therethrough with a magnet mounted on an input shaft of a register mechanism, for instance, as shown in the aforementioned U.S. Pat. No. 3,308,664, and in Kullmann U.S. Pat. No. 3,248,583, issued Apr. 26, 1966.

A guide and output arm 76 is secured to the inner end of shaft 72, at the inner end of boss 70, and has a drive pin 78 mounted therein and extending outwardly for engagement in an appropriate center opening 80 in piston 52. The rotatable arm 76 and pin 78 thus serve as means for controlling and guiding the oscillating movement of piston 52 and for driving the output magnet 74 in response to the oscillations of piston 52 about hub 48 and division plate 50. While pin 78 is mounted in arm 76 and engages an opening in piston 52 in the illustrated embodiment, it will be appreciated that the pin also may be mounted in or may be integral with piston 52 and engage an opening in the arm 76. Alternatively, a similar pin may be mounted on the piston and engage a suitable guide surface within hub 48, as through a roller element, for guiding the oscillations of the piston 52 and also engage a finger or arm, similar to arm 76 for driving an output element.

The division plate 50 extends from the hub 48 to the sidewall 46 between inlet port 55 and outlet port 56, and is provided with a pair of pins 81 which engage in openings 82 in the bottom wall 44. As illustrated, the division plate has a rounded inner edge 84, which engages a complementary groove 86 in hub 48. The hub 48 and plate 50 are formed of a suitable material, such as a molded plastic, and may be molded as an integral unit for mounting in the housing 42.

Referring now also to FIG. 5, piston 52 is a so-called U-shaped piston having an end wall or web 88 and a sidewall 90 and is formed with openings 92 (see FIG. 2) and 93 for cooperation with a division plate 50 and with ports 55 and 56 in housing 42. Wall 88 is formed with opening 80 at its center, and with openings 89 distributed thereover to equalize the pressure inside and outside the piston. Piston 52 may be of the improved construction disclosed in the copending application, Ser. No. 664,441 of Ralph R. Graber, filed Aug. 30, 1967 now U.S. Pat. No. 3,496,772, issued Feb. 24, 1970.

As seen in FIGS. 1 and 3, the piston 52 is of a height corresponding to the internal height of sidewall 46 of the metering chamber housing whereby the outer surface 94 is essentially coplanar with the outer end 96 of sidewall 46. Division plate 50 is of a similar height, also having its outer end essentially coplanar with the outer end of sidewall 46, and hub 48 is of a height equal to the internal height of sidewall 46, less the thickness of the piston wall 88.

Figure 12:
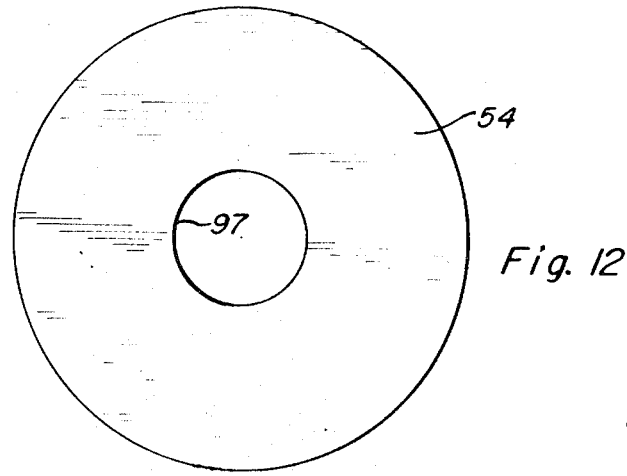
FIG. 12 is a plan view of the cover for the measuring chamber of the apparatus in FIG. 1, and FIG. 13 (sheet 2) is a partial cross-sectional view of another oscillating piston measuring device embodying teachings of this invention.

Referring to FIGS. 1 and 12, the cover 54 is a flat plate having a planar undersurface which engages the outer end 96 of the sidewall 46 and extends over the open end of the housing 42 in effective sealing contact with the outer surfaces of division plate 50 and piston 52 as well as with end 96 of housing 42. Thus, the cover prevents leakage of fluid between or from the metering compartments defined within housing 42 by the housing walls, hub 48, piston 52 and the cover. Cover 54 is formed with a central opening 97 to assist in equalizing the pressure above and below the cover, to avoid any substantial unbalanced pressure buildup that might tend to raise the cover from the housing 42. Opening 97 may be nearly as large as the diameter of hub 48, but preferably is somewhat smaller to provide a large tolerance for the positioning of the cover, (note the clearance of cover 54 from the casing around its periphery as seen in FIG. 1). That is, the cover 54 must extend inwardly over the piston in the annular area between wall 42 and hub 48, and over the wall of hub 48 to prevent leakage between the metering compartments through the holes 89 in piston 52.

It will be appreciated that the cover 54 does not provide any output or guiding function for the piston 52, and it does not mate or fit any surface except the outer planar surfaces 94 and 96 and the end of plate 50. Accordingly, the sole critical dimension for cover 54 is that its undersurface be planar. The lateral or radial dimensions and positioning of the cover are not critical so long as it extends over the outer end of the chamber sidewall, over the outer end of hub 48, and over the annular area therebetween.

Referring to FIGS. 6, 7 and 8, the casing unit 22 is formed with a shoulder 100 at either side of the outlet 34. The shoulders 100 include portions 102 extending outwardly from the wall 26 for laterally confining a resilient rectangular gasket 104. Horizontal surfaces 106 are provided for supporting the measuring chamber device 40 axially of the casing. The casing unit 22 also is formed with a further pair of shoulder 108 equally spaced around the circumference of wall 26. Each of these shoulders includes a horizontal support surface 110 coplanar with surfaces 106 for supporting the measuring chamber device 40 axially of the meter, and with a vertical surface for laterally positioning the chamber. It will be noted that the vertical surfaces 112 have only a small vertical dimension, whereby they engage the housing 42 only adjacent bottom wall 44.

The various surfaces of shoulder elements 100 and 108 need not be formed with great accuracy for positioning the measuring chamber unit. The horizontal dimension or radial clearance between the various vertical surfaces of the shoulders 100 and 108 is not critical and is somewhat greater than required by the diameter of the housing 42 (see FIG. 7). Gasket 104 is of sufficient thickness to protrude beyond the vertical portions 102. When the housing 42 is positioned on the shoulders in the casing, gasket 104 is compressed between wall 46 around port 56 and wall 26 around outlet 34 to define a flow path therebetween. Thus gasket 104 allows for variances in the internal dimensions in casing unit 22 and in the outer diameter of housing 42. Further, the only lateral forces on wall 46 occasioned by the mounting of device 40 are those forces due to the compression of the resilient gasket 104 as opposed by the vertical surfaces of shoulders 108. Accordingly, lateral forces are exerted on the sidewall 46 only in those areas where this wall is reinforced by the end wall 44, thereby avoiding bending or distortion of the sidewall in mounting the metering chamber device. This permits the sidewall 46 to be of relatively thin flexible material.

Figure 10:
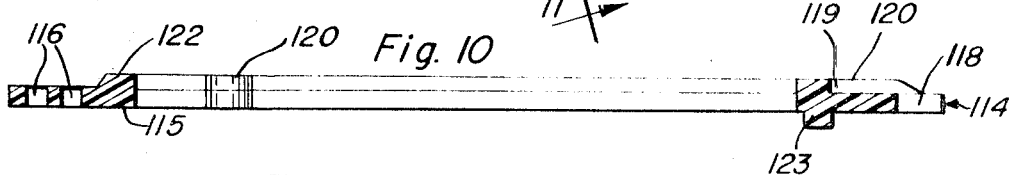
FIG. 10 and 11 are cross-sectional views taken along radial lines 10-10 and 11-11 of FIG. 9, respectively, and looking in the direction of the arrows.
Figure 11:
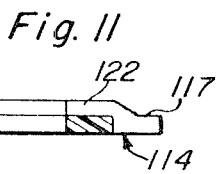

Referring now to FIGS. 1, 7, 9, 10 and 11, an annular strainer 114 is mounted on shoulders 100 and 108. The outer edge portion of end wall 44 rests on the inner annular edge 115 of strainer 114, and the strainer extends outward closely adjacent the sidewall 26 (see FIG. 1) whereby the strainer is interposed in the path of flow of fluid from the inlet 32 to the inlet port 55 in end wall 44. Referring particularly to FIGS. 9 to 11, it will be noted that the strainer 114 is essentially foraminous throughout the major portion of its area, being formed with a plurality of closely spaced openings 116 throughout an annular flange 117. Slots 118 and U-shaped recessed 119 with ribs 120 therearound are provided for engaging shoulders 108, and the strainer is recessed at 121 to accommodate the lower edge of the gasket 104 and the shoulders 100. An annular reinforcing rib 122 is provided at the inner edge of flange 117. The strainer is formed with a projection 123 which engages an opening 124 in end wall 44 (see FIGS. 2 and 3). Since the strainer 114 is angularly indexed by engagement of the slots 118 and recesses 119 on shoulders 108, engagement of projection 123 in opening 124 provides an effective index for the angular positioning of the measuring device 40 to place port 55 in registry with gasket 104 and outlet 34. The inner edge of the strainer jogs outward in the area 125 to clear the inlet port 55. Strainer 114 may be formed of any suitable material, with due consideration for compatibility with the fluid to be metered. For use in a water meter, or with many other fluids the strainer may be molded of a plastic material such as polypropylene.

Referring again to FIG. 1, a resilient annular element 126 is positioned between the closure cap 28 and cover 54. The element 126 is received within an appropriate groove or recess 128 on the inner side of cap 28 and is of a diameter to overlie sidewall 46. A resilient sealing O-ring 130 is engaged between the sidewall 26 and the cap 28. As the cap is tightened into sealing engagement with the O-ring 130, resilient member 126 is placed in compression to retain cover 54 on housing 42 and to maintain device 40 seated on surfaces 106 and 110 of shoulders 100 and 108. Resilient member 126 permits substantial variation in the vertical dimensions of the elements being assembled, e.g., the position of surfaces 106 and 110 in casing unit 22, the outside height of housing 42, the thickness of cover 54, the thickness of strainer 114, and the position of cover 28 relative to surfaces 106 and 110. It will also be noted that there may be a significant radial clearance between the outer edge of cover 54 and sidewall 26, as there is no requirement for close tolerance alignment of the cover, as aforenoted.

The various components of the modification illustrated in FIG. 13 are substantially the same as the corresponding components described above and are identified by the same numerals, except as noted below. This embodiment illustrates an arrangement suitable for employment of teachings of this invention in a so-called split case type of meter; that is, a meter in which the register element is positioned on the cover side of the measuring chamber device 40. In this arrangement an elongated drive pin 142 mounted in arm 76 extends outward through opening 97 to engage a suitable element for an output drive (not shown) supported on the meter casing. For instance, pin 142 may engage an arm similar to arm 76 which is connected to a shaft rotatably supported on the casing over cover 54 and carrying an annular drive magnet adjacent the top wall of the casing for magnetic drive engagement with an input magnet of a register mechanism in substantially the same manner noted above. It will be noted that opening 97 is of sufficient diameter to permit the orbital movement of pin 142 therein.

The cup-shaped housing 42 is economically formed by stamping and drawing a suitable metal blank to the requisite configuration. The inner surfaces of the sidewall and end wall conveniently may be machined to obtain the dimensional tolerances required therein, or may be coined to size, and the outer end surface 96 may be machined to ensure the requisite accuracy of the internal height dimension. Machining of the inner surfaces of the housing 42 may be carried out conveniently in a single pass over sidewall 42, and a single pass inward across a radius of wall 44 terminating at the opening 60. The openings may be stamped in housing 42 and the cover 54 may be formed by stamping from a flat blank. In one illustrative metering apparatus utilizing the construction described herein for a so-called 5/8 inch oscillating piston water meter, the measuring chamber housing 42 and cover 54 were formed of 0316 stainless steel. The housing was stamped and drawn from a flat blank and was machined to 2.700 inch ID, and had side and end walls of 0.062 inch thickness (16 U.S. gauge), with an internal height of the sidewall of 1.026 inch for a piston 1.025 inch in height. The cover also was stamped from flat stock and was 0.062 inch thick with two parallel flat surfaces, and was 3.225 inch OD with opening 97 being 0.937 inch in diameter. The inner hub was 1.130 inch OD. The measuring device 40 was supported in a casing unit 22 of 3.150 inch ID, with a 3.395 inch ID in the portion receiving cover 54 (see FIG. 1), thereby providing 0.170 inch radial clearance for the cover. Gasket 104 was formed neoprene rubber, and member 126 was 0.200 inch thick and also formed of neoprene.

It will be appreciated that in a stamping and drawing operation there may be some variation in the thickness of the walls and in the outside dimensions. However, all elements of the piston chamber requiring close tolerance cooperative dimensions, including the inner surfaces and the internal height of the measuring chamber, the inner hub 48 and the division plate 50 are part of or are mounted on the housing 42. Accordingly, the outer dimensions and the positioning of the cup-shaped housing and/or the cover 54 are not critical, so long as the annular piston chamber area is closed by the flat cover.

Stamped metal housings as disclosed herein can be conveniently and economically formed within tolerances which will maintain a high degree of metering accuracy. Further, such a thin walled measuring device permits the use of a casing of a reduced size, and may be utilized in a meter assembly as disclosed herein without lateral deforming forces being applied to the sidewalls.

It will be appreciated by those skilled in the art that the cover is one of the elements which is subjected to significant wearing action in the operation in this type of meter, due to rubbing of the piston thereon. By providing a cover 54 which is a flat plate, having two planar surfaces, it simply may be turned over when one side becomes worn.

The housing 42 and cover 54 may be formed of suitable materials, one advantageous material for water meters and may other uses, and one which may be conveniently stamped and drawn as indicated, being stainless steel. However, for some uses, such as in gasoline meters, plain carbon steel or aluminum would also be satisfactory. The various other components of course, may be fabricated of materials suitable to the functions noted therefor, with due consideration for compatibility with the fluid to be metered.

It will be seen that improvements have been provided whereby the construction and fabrication of oscillating piston meters is greatly simplified. The number of dimensions which must be maintained within close tolerances has been substantially reduced, and the components may be economically fabricated. At the same time a structure is provided which retains a high degree of metering accuracy. Accordingly, meters are provided which maintain a high degree of metering accuracy and which may be economically produced.

It will be appreciated that the illustrated machine embodies several new and novel features which cooperate to obtain the broader objects set forth herein. At the same time it also will be appreciated that certain of these features have utility apart from their incorporation in the overall combinations illustrated herein.

While particular embodiments of this invention have been shown, it will be understood, of course, that the invention is not limited thereto since modifications may be made by those skilled in the art, particularly in light of the foregoing teachings. Therefore, it is contemplated by the appended claims to cover any such modifications as incorporate those features which may be said to constitute the essential features of these improvements, within the true spirit and scope of the invention.

I claim:

1. Metering apparatus of the oscillating piston type comprising a housing defining a cylindrical chamber having and end wall and a sidewall, a piston oscillatable in said chamber and having an outer surface coplanar with the outer end of said sidewall, guide means for said piston disposed within said chamber and mounted on said housing, a casing spaced from the open end of said housing, a cover independent of said casing and having a planar undersurface overlying said piston and the outer end of said sidewall, and resilient means disposed between said casing and said cover for maintaining said undersurface in engagement with the outer end of said sidewall.

2. Measuring chamber apparatus as in claim 1 wherein said guide means includes an inner cylindrical hub, and said planar undersurface extends over the area between said hub and said sidewall.

3. Measuring chamber apparatus as in claim 1 wherein said cover is a flat plate.

4. Measuring chamber apparatus as in claim 1 wherein said housing comprises a drawn metal cup including said end wall and said sidewall.

5. Measuring chamber apparatus as in claim 4 wherein the inner surfaces of said cup-shaped member are machined.

6. Measuring chamber apparatus as in claim 1 wherein said guide means comprises an inner hub and a division plate secured to said housing, the outer edge of said division plate being coplanar with the outer end of said sidewall, said piston being oscillatable in said chamber, about said hub and said division plate, and including a web adjacent said planar under surface of said cover.

7. Metering apparatus as in claim 1 wherein there is a substantial radial clearance between said cover and said casing.

8. Metering apparatus as in claim 1 wherein said resilient means is an annular element disposed over said cover in substantial alignment with said sidewall.

9. Metering apparatus comprising an oscillating piston measuring unit including a cup-shaped housing defining a chamber and having an end wall and a sidewall, a cover on the open end of said chamber, inlet and outlet ports in the walls of said chamber, at least one of said ports being in said sidewall, a casing surrounding said measuring unit and defining a cavity the walls of which are spaced from said measuring unit, said casing having an inlet passage and an outlet passage, resilient means engaging said sidewall and defining a flow path from said port therein to one of said passages and means for positioning and supporting said measuring unit in said casing including means for laterally supporting said housing for engagement of said sidewall with said resilient means by applying lateral support only in substantial alignment with said end wall to avoid deformation of said housing.

10. Metering apparatus as in claim 9 wherein said means for positioning and supporting said measuring unit is adapted to apply axial support force to said measuring unit only in substantial alignment with said sidewall.

11. Metering apparatus as in claim 9 wherein said casing includes a first section defining a cup-shaped cavity for receiving said measuring unit, and a cover section.

12. Metering apparatus as in claim 9 wherein said port in said sidewall aligned with one of said passages and said resilient means comprises a gasket element surrounding said port and confined between said sidewall and said casing.

13. Metering apparatus as in claim 9 wherein said casing includes support lugs engaging said housing adjacent said end wall.

14. Metering apparatus as in claim 13 including an annular screen element engaging said lugs, said housing being disposed with said end wall resting on said screen element and having said inlet port in said end wall, said screen element extending from said housing outward to the wall of said casing, and the other of said passages being on the opposite side of said screen element from said inlet port whereby said screen element is interposed in the path of flow of fluid from said other of said passages to said inlet port.

15. Metering apparatus as in claim 14 wherein said screen element includes index means engaging said housing.

16. Metering apparatus as in claim 9 wherein said housing comprises a drawn metal cup including said end wall and said sidewall.

17. Metering apparatus as in claim 16 wherein the outer end of said sidewall defines a plane and said cover is a flat plate.

18. Metering apparatus including a casing defining a generally cup-shaped cavity having an end wall and a sidewall and having inlet and outlet passages through said sidewall, an element having an annular screen portion positioned in said cavity between said passages and said end wall and in spaced relation to said end wall, a measuring unit including a housing having an inlet port in an end wall thereof disposed in said cavity on said screen element with said port communicating with the space in said cavity between said screen and said casing end wall, said casing sidewall being spaced from said housing sidewall, an outlet port in said housing, means defining a flow path between said outlet port and said outlet passage, and said screen element extending outward from said housing to the inner surface of said casing whereby said screen portion is interposed in the path of flow of fluid between said inlet passage and said inlet port.

19. Metering apparatus comprising an oscillating piston measuring unit including a cup-shaped housing defining a chamber and having an end wall and a sidewall, a cover on the open end of said chamber, an inlet port in said end wall and an outlet port in said sidewall of said chamber, a casing surrounding said measuring unit and defining a cavity the walls of which are spaced from said measuring unit, said casing having an inlet passage and having an outlet passage aligned with said outlet port, resilient gasket means confined between said sidewall and said casing circumjacent said aligned outlet port and outlet passage and defining a flow path therebetween, and means for positioning and supporting said measuring unit in said casing including means for laterally supporting said housing generally opposite said outlet port for maintaining said resilient gasket means in sealing engagement with said sidewall and said casing.

20. Measuring chamber apparatus of the oscillating piston type comprising a housing including an end wall and a sidewall defining a cylindrical chamber, a cup-shaped piston oscillatable in said chamber, guide means for said piston including an inner cylindrical hub secured in said housing and extending within said piston, a shaft rotatably journaled in said hub, a crank arm disposed within said hub and secured to said shaft, a pin member engaging said piston and said crank element for guiding the oscillations of said piston and rotating said shaft as said piston oscillates in said chamber.

21. Measuring chamber apparatus as in claim 20 wherein said shaft extends through said end wall, and including a register drive member mounted on said shaft externally of said chamber.

22. Measuring chamber apparatus of the oscillating piston type comprising a housing including an end wall and a sidewall defining a cylindrical chamber, a cup-shaped piston oscillatable in said chamber and having a web portion adjacent one end of said chamber, guide means for said piston including an inner cylindrical hub secured in said housing, said hub extending through the open end of said piston to the undersurface of said web portion, a shaft rotatably journaled in said hub, a crank arm disposed within said hub adjacent said web and secured to said shaft a pin member engaging said piston and said crank element for guiding the oscillations of said piston and rotating said shaft as said piston oscillates in said chamber.

UNITED STATES PATENT OFFICE
CERTIFICATE OF CORRECTION

Patent No. 3,587,314   Dated June 28, 1971

Inventor(s) Donald J. Kullmann

It is certified that error appears in the above-identified patent and that said Letters Patent are hereby corrected as shown below:

In references cited, "Grangor" should read -- Granger --. Column 2, line 18, "FIG. 10 and 11" should read -- FIGS. 10 and 11 --. Column 3, line 21, after "1967" insert a comma -- , --. Column 3, line 67, "shoulder" should read -- shoulders --. Column 4, line 34, "recessed" should read -- recesses --. Column 4, line 51, "polyropylene" should read -- polypropylene --. Column 5, line 31, "0316" should read -- #316 --. Column 5, line 42, after "formed" insert -- of --. Column 6, line 31 (claim 1), "and" should read -- an --. Column 6, line 58 (claim 6), "under" should read -- under- --. Column 7, line 13 (claim 12), after "sidewall" insert -- is --. Column 8, line 43 (claim 22), after "shaft" insert a comma -- , --.

Signed and sealed this 29th day of February 1972.

(SEAL)
Attest:

EDWARD M. FLETCHER, JR.
Attesting Officer

ROBERT GOTTSCHALK
Commissioner of Patents